United States Patent [19]

Steinberg

[11] Patent Number: 5,746,005
[45] Date of Patent: May 5, 1998

[54] ANGULAR POSITION SENSOR

[75] Inventor: David E. Steinberg, Cleveland Heights, Ohio

[73] Assignee: Powerhorse Corporation, Beachwood, Ohio

[21] Appl. No.: 734,830

[22] Filed: Oct. 22, 1996

[51] Int. Cl.$^6$ ................................................ B43L 5/00
[52] U.S. Cl. ................................................ 33/1 PT; 33/1 N
[58] Field of Search ................................ 33/1 N, 1 PT, 33/1 AP, 534; 318/602; 250/231.13, 231.16, 231.18

[56] References Cited

U.S. PATENT DOCUMENTS

| | | | |
|---|---|---|---|
| 2,775,755 | 12/1956 | Sink | 33/1 PT |
| 2,944,157 | 7/1960 | McAuslan et al. | 33/1 PT |
| 3,096,444 | 7/1963 | Seward | 33/1 PT |
| 4,449,191 | 5/1984 | Mehnert | 33/1 PT |
| 4,719,449 | 1/1988 | Cousseau | 33/1 PT |
| 5,032,999 | 7/1991 | Finger et al. | 33/1 PT |
| 5,216,346 | 6/1993 | Murkami | 318/602 |
| 5,301,434 | 4/1994 | Imaizumi | 33/1 PT |

*Primary Examiner*—G. Bradley Bennett
*Attorney, Agent, or Firm*—James A. Hudak

[57] ABSTRACT

An angular position sensor having high angular resolution and which provides an immediate indication of the angular position being measured upon the application of power to the position sensor is disclosed. A quadrature disk having a continuous notch or recess in the outer periphery thereof is rotatable with respect to quadrature sensors positioned in a spaced-apart relationship with respect to one another. Differing radii on the quadrature disk cause the actuation and deactuation of the quadrature sensors as the disk passes thereunder producing sharply defined output signal transitions. While this is occurring, the Hall-effect sensor produces a sine wave output. The orientation of the quadrature disk with respect to the quadrature sensors is such that the output signal transitions produced by the quadrature sensors correspond with the maximum and minimum values of the sine wave produced by the Hall-effect sensor. The resulting rotation and quadrant data from the quadrature sensors and the Hall-effect sensor are applied as inputs to a microprocessor where a determination of the angular orientation of the member connected to the angular position sensor is made with respect to any arbitrary reference point.

18 Claims, 1 Drawing Sheet

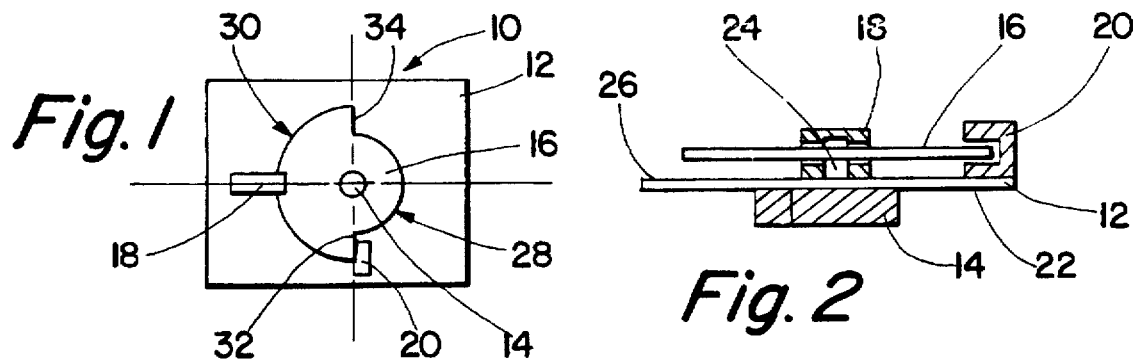
Fig. 1
Fig. 2
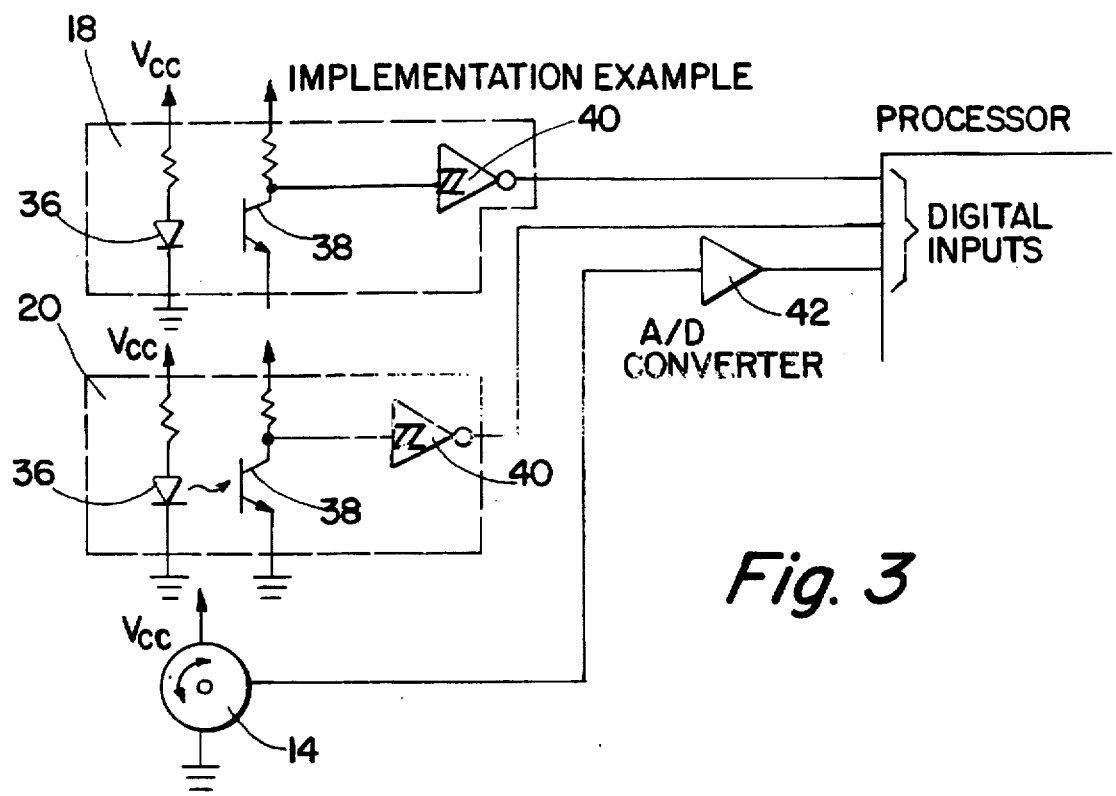
Fig. 3
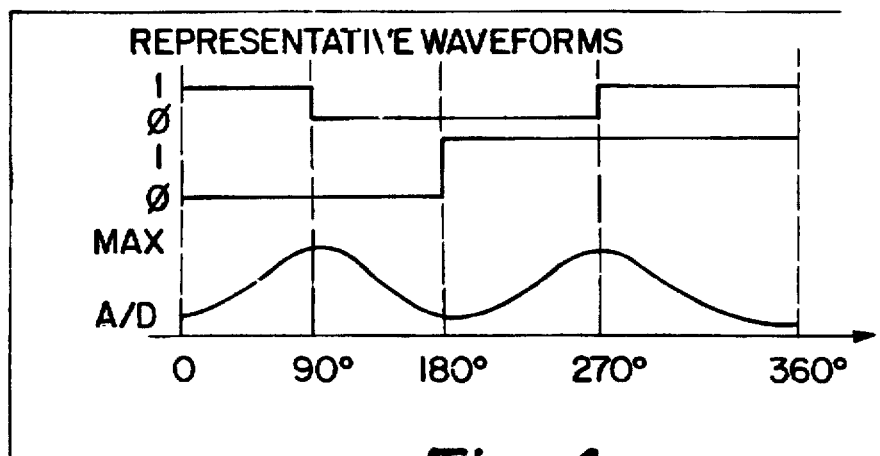
Fig. 4

ANGULAR POSITION SENSOR

TECHNICAL FIELD

The present invention relates, in general, to a sensor for determining the position of a member and, more particularly, to a sensor that precisely determines the angular position of the member with respect to an arbitrary reference point or another member.

BACKGROUND ART

Angular position sensors that are presently available can be classified into two categories or types: (1) rotary position transducers, and (2) optical encoders. A review of these sensors reveals that both of these sensor types have inherent disadvantages. The following is a review of these types of sensors and an enumeration of the inherent disadvantages associated with each sensor type.

The most common rotary position transducer is typically comprised of a circular strip of resistive material whose surface is swept by a contact. The relative resistance between the moving contact and either end of the circular strip is representative of the angular position of a member, operatively connected to the contact, with respect to an arbitrary reference point. Since the contact is placed on the same surface as the circular strip of resistive material, there is a discontinuity in the strip typically within a range of 15° to 20°. Consequently, this type of rotary position transducer cannot be utilized when a measurement of more than approximately 340° of angular rotation is desired, and thus this transducer cannot be utilized when the measurement of a continuous 360° circle is required. This inherent measurement limitation restricts the use of this type of rotary position transducer. In addition, this type of rotary position transducer tends to be quite costly due to the special resistive media required for high linearity and temperature performance.

Another type of rotary position transducer utilizes a series of concentric conductive circular strips which contact corresponding concentric moving contacts on a common shaft. With the utilization of the proper contact strip pattern, the moving contacts open and close with respect to one another producing a unique binary output for each rotational position. Presently, this type of rotary position transducer can represent only 128 unique positions, thus limiting angular measurement resolution to 2.81°. Even though this type of rotary position transducer is relatively inexpensive, its usage is restricted due to its extremely limited angular resolution.

Another type of rotary position transducer utilizes one or more Hall-effect sensors. This transducer is operated by moving magnets past fixed Hall-effect sensors to produce a sine wave output signal based upon the relative strength of the magnetic fields, and thus, shaft position. This transducer produces an output signal having the same discrete value at more than one angular position, and thus, the combination of an indexing device, external memory storage device and shaft movement detector is required in order to determine the actual rotational angle being measured. In addition, if the shaft of the Hall-effect transducer is rotated while power is interrupted to the transducer, it is impossible to determine the new angle immediately upon the reapplication of power. Upon the restoration of power to the transducer, the angle of the output shaft of the Hall-effect sensor cannot be determined until the shaft starts rotating, the direction of rotation is determined independently, and the polarity of the slope of the sine wave is calculated.

The optical encoder sensor is typically constructed from a clear disk having spaced-apart radial lines inscribed thereon. The disk passes beneath two photo-interrupters that are positioned such that at any point in time only one interrupter is blocked by a radial line. The resulting pair of signals produced by the photo-interrupters have a phased relationship which permits the determination of direction of rotation. By counting signal transitions from an arbitrary reference point, a measurement of the angular displacement of a member can be made. An index or absolute reference point signal may be generated internally or by an external sensor, such as a proximity detector. The disadvantage of this type of transducer is that the optical encoder requires an external memory storage device to retain the signal transition count with respect to the index or absolute reference point. In addition, if the mounting shaft for the disk is rotated while power is interrupted to the transducer, the angle being measured when power is reapplied to the transducer cannot be determined until the index or absolute reference point is again passed It view of the foregoing problems associated with the prior art devices available for determining the angular position of a member, it has become desirable to develop a simple, inexpensive angular position sensor that has high measurement resolution and which, without any additional rotation or index referencing requirements, immediately provides an angular position measurement of the member when power is restored to the sensor after a power interruption.

SUMMARY OF THE INVENTION

The present invention solves the problems associated with the prior art devices and other problems by providing a simple angular position sensor that has high angular resolution and which, without any additional rotation or index referencing requirements, immediately provides the angular position of the member being measured when power is restored to the position sensor after a power interruption has occurred. The angular position sensor of the present invention is comprised of a mounting plate, a Hall-effect sensor, a quadrature disk, and quadrature sensors. The quadrature disk is typically circular in configuration and has a continuous 180° notch or recess that acts as the sensor actuation region in the periphery thereof resulting in the formation of an oppositely disposed continuous 180° sensor deactuation region also in the periphery thereof. The transition between the sensor actuation region and the sensor deactuation region results in oppositely disposed radially extending edges connecting same in the quadrature disk. The quadrature sensors are mounted to the top surface of the mounting plate and are angularly positioned so as to be 90° apart with respect to one another and oriented such that the sensor deactuation region on the quadrature disk passes thereunder. In this manner, the radially extending edges on the quadrature disk define the transition points between the actuation and deactuation states of the sensor, and vice versa. When the notch on the quadrature disk passes under one of the quadrature sensors, the quadrature sensor is actuated resulting in the production of a sharply defined output signal transition. As the quadrature disk rotates, the Hall-effect sensor produces a sine wave output corresponding to one complete cycle for every 180° of output shaft rotation.

Since the quadrature sensors are angularly positioned 90° apart with respect to one another, the passing of the quadrature disk under the quadrature sensors results in the production of a two-bit binary value for each 90° quadrant of rotation. The orientation of the quadrature disk with respect to the quadrature sensors is such that the sharply defined output signal transitions produced by the quadrature sensors correspond with the maximum and minimum values of the sine wave produced by the Hall-effect sensor. The output of the Hall-effect sensor is conditioned by an analog to digital converter and the resulting rotation and quadrant data are applied as inputs to a microprocessor where, through a simple algorithmic calculation, a determination of the angular orientation of the member connected to the angular position sensor can be made with respect to any arbitrary reference point. Since the signals produced by the quadrature sensors and the Hall-effect sensor are directly dependent on mechanical relationships between and among the aforementioned sensors and the quadrature disk, an immediate indication of angular position is produced upon the subsequent application of power to the angular position sensor after power is interrupted thereto.

BRIEF DESCRIPTION OF THE DRAWINGS

FIG. 1 is a top plan view of the angular position sensor of the present invention.

FIG. 2 is a cross-sectional view taken across section-indicating lines 2—2 in FIG. 1.

FIG. 3 is a schematic drawing of the angular position sensor of the present invention.

FIG. 4 illustrates representative waveforms produced by the quadrature sensors and the Hall-effect sensor utilized by the present invention.

DESCRIPTION OF THE PREFERRED EMBODIMENT

Referring now to the drawings where the illustrations are for the purpose of describing the preferred embodiment of the present invention and are not intended to limit the invention described herein, FIG. 1 is a top plan view of the angular position sensor 10 of the present invention. The angular position sensor 10 is comprised of a mounting plate 12, a Hall-effect sensor 14, a quadrature disk 16, and quadrature sensors 18, 20. The Hall-effect sensor 14 is mounted or attached to the bottom surface 22 of the mounting plate 12 and the output shaft 24 of the Hall-effect sensor 14 is received through an aperture (not shown) in the mounting plate 12 so as to be positioned above the top surface 26 of the mounting plate 12. The quadrature disk 16 is typically circular in configuration and has a continuous notch, shown generally by the numeral 28, over 180° of the outer periphery thereof resulting in an oppositely disposed semi-circular continuous 180° sensor deactuation region, shown generally by the numeral 30, adjacent the periphery of the disk 16. The transition between notch 28 and sensor deactuation region 30 results in radially extending edges 32, 34 in quadrature disk 16. Edges 32 and 34 are angularly positioned so as to be 180° apart with respect to one another. Quadrature sensors 18, 20 are mounted or attached to the top surface 26 of mounting plate 12 and are angularly positioned so as to be 90° apart with respect to one another and oriented on mounting plate 12 such that the sensor deactuation region 30 on quadrature disk 16 passes thereunder, as shown in FIGS. 1 and 2. In this manner, the differing radii defining the notch 28 and the sensor deactuation region 30 on quadrature disk 16 cause the actuation and deactuation of the quadrature sensors 18, 20 as the quadrature disk 16 passes thereunder.

The quadrature sensors 18, 20 can be photo-interrupters, microswitches, proximity sensors or other similar sensors which produce a binary output or an analog output corresponding to the two distinct states representative of the two radii defining the notch 28 and the sensor deactuation region 30 on the quadrature disk 16. If the quadrature sensors produce an analog output, an analog to digital converter (not shown) is also employed.

Assuming that a photo-interrupter is utilized for the quadrature sensors 18, 20, each sensor is shown schematically in FIG. 3 as a light emitting diode 36, a photo-transistor 38 and a signal conditioner 40. Operationally, when notch 28 on quadrature disk 16 passes under one of the quadrature sensors 18, 20, the light from its associated light emitting diode 36 is intercepted by its associated photo-transistor 38 causing the transistor 38 to conduct resulting in the production of a binary 0 output which is conditioned by signal conditioner 40. Conversely, when light from the light emitting diode 36 is blocked by the sensor deactuation region 30 on the quadrature disk 16, thus preventing any light from being intercepted by photo-transistor 38, transistor 38 does not conduct producing a binary 1 output. The signal conditioner 40 produces a sharply defined output signal transition, as shown in FIG. 4, when either the photo-transistor 38 goes from the non-conducting state to the conducting state or from the conducting state to the non-conducting state. In the schematic drawing illustrated in FIG. 3, the signal conditioner 40 is an inverting signal conditioner utilizing a Schmitt trigger circuit to produce sharply defined output signal transitions. It should be noted that when a photo-interrupter is utilized for the quadrature sensors 18, 20, a signal conditioner 40 is required in order to produce sharply defined output signal transitions. If another type of sensor or switch is utilized for the quadrature sensors 18, 20, a signal conditioner 40 may not be required if the sensor or switch produces a sharply defined output signal transition.

The Hall-effect sensor 14 produces a sine wave output corresponding to one complete cycle for every 180° of output shaft rotation, as shown in FIG. 4. Since the quadrature sensors 18, 20 are angularly positioned 90° apart with respect to one another, the passing of the quadrature disk 16 under the quadrature sensors 18, 20 results in the production of a two-bit binary value for each 90° quadrant of rotation. The orientation of the quadrature disk 16 with respect to the quadrature sensors 18, 20 is such that the transitions in the outputs of the quadrature sensors 18, 20 correspond with the maximum and minimum values (peaks and valleys) of the sine wave produced by the Hall-effect sensor 14. For example, referring to FIG. 4, the transitions in the output of quadrature sensor 18 correspond with the 90° and 270° transitions in the output of the Hall-effect sensor 14, whereas the transitions in the output of quadrature sensor 20 correspond with the 180° and 360° transitions in the output of the Hall-effect sensor 14. The outputs of the quadrature sensors 18, 20 are applied as inputs to a microprocessor (not shown). The output of the Hall-effect sensor 14 is conditioned by an analog to digital converter 42 and the resulting rotation and quadrant data, in digital form, are then applied as inputs to the microprocessor where, through a simple algorithmic calculation, a determination of the angular orientation of a device connected to the angular position sensor 10, or a component within the device, can be made with respect to any arbitrary reference point.

When power is interrupted to the angular position sensor 10 and then subsequently reapplied, the sensor 10 immediately produces an indication of the angular position of the device connected to the sensor, or to a component within the device, even if the device has been moved angularly during the power interruption. The immediate indication of angular position is possible since the output signals produced by the quadrature sensors 18, 20 and the Hall-effect sensor 14 are directly dependent on mechanical relationships between and among the aforementioned sensors and the quadrature disk 16. Because of this dependency, an external memory storage device and/or the passing of an index or reference point by the quadrature disk 16 is not required in order to obtain an angular position measurement after power restoration.

Operationally, it should be noted that the angular position sensor 10 can be mounted in two manners in order to determine the angular position of a specific device, or a component within the device, with respect to any arbitrary reference point. In one instance, the mounting plate 12 can be anchored to an immovable object such as the internal components within a housing (not shown) and the quadrature disk 16 can be attached to the housing which rotates relative to the internal components therein. For example, the mounting plate 12 can be mounted to a stationary slip-ring assembly, and the quadrature disk 16 can be attached to a housing which rotates with respect to the slip ring assembly. Conversely, the quadrature disk can be held stationary, and the mounting plate 12 can be attached to a component which is rotating relative to the quadrature disk. Regardless of the manner in which the mounting plate and/or the quadrature disk are attached to a rotating component, the only operating requirement for the angular position sensor 10 is the existence of relative angular movement between the quadrature disk 16 and the mounting plate 12.

Certain modifications and improvements will occur to those skilled in the art upon reading the foregoing. It should be understood that all such modifications and improvements have been deleted herein for the sake of conciseness and readability, but are properly within the scope of the following claims.

I claim:

1. Apparatus for determining the angular position of a member with respect to a reference comprising:

a mounting plate;

a first sensor operatively attached to said mounting plate;

a second sensor operatively attached to said mounting plate and positioned in a spaced-apart relationship with respect to said first sensor;

a disk member positioned adjacent said first and second sensors and being rotatable with respect to said mounting plate and said first and second sensors; and means for producing a waveform, rotation of said disk member with respect to said mounting plate causing the actuation of said first and second sensors producing output signals substantially coinciding with a first point and a second point on said waveform.

2. The apparatus as defined in claim 1 wherein said disk member has a notch formed in the outer periphery thereof.

3. The apparatus as defined in claim 2 wherein said notch on said disk member is continuous and covers substantially 180° of the outer periphery of said disk member.

4. The apparatus as defined in claim 2 wherein said notch is defined by a first end and a second end formed by radially extending edges positioned approximately 180° apart.

5. The apparatus as defined in claim 4 wherein movement of said radially extending edges past said first and second sensors causes the actuation of said first and second sensors.

6. The apparatus as defined in claim 1 wherein said output signals produced by said first and second sensors are periodic.

7. The apparatus as defined in claim 1 wherein said output signals produced by said first and second sensors are square waves.

8. The apparatus as defined in claim 1 wherein said first and second sensors are positioned approximately 90° apart with respect to one another.

9. The apparatus as defined in claim 7 wherein said square waves produced by said first and second sensors have a period of approximately 360°.

10. The apparatus as defined in claim 1 wherein said waveform is a sinusoidal wave.

11. The apparatus as defined in claim 10 wherein said sinusoidal wave has a period of approximately 180°.

12. The apparatus as defined in claim 10 wherein said sinusoidal wave has alternating peaks and valleys spaced approximately 90° apart.

13. The apparatus as defined in claim 12 wherein said actuation of said first and second sensors coincides approximately with said peaks and valleys of said sinusoidal wave.

14. The apparatus as defined in claim 1 wherein said waveform producing means is a Hall-effect sensor.

15. The apparatus as defined in claim 1 further including means for conditioning said output signals produced by said first and second sensors to generate sharply defined output signal transitions from said first and second sensors.

16. The apparatus as defined in claim 1 further including means for converting said waveform produced by said waveform producing means from analog to digital form.

17. The apparatus as defined in claim 1 wherein said disk member is rotatable with respect to said mounting plate.

18. The apparatus as defined in claim 1 wherein said mounting plate is rotatable with respect to said disk member.

* * * * *